Dec. 23, 1969   R. R. COMPTON   3,485,074
APPARATUS FOR DEBURRING AND CLEANING WITH MICROSCOPIC GLASS BEADS
Filed April 29, 1968   4 Sheets-Sheet 1

INVENTOR
RICHARD R. COMPTON
BY
Mason, Mason & Albright
ATTORNEYS

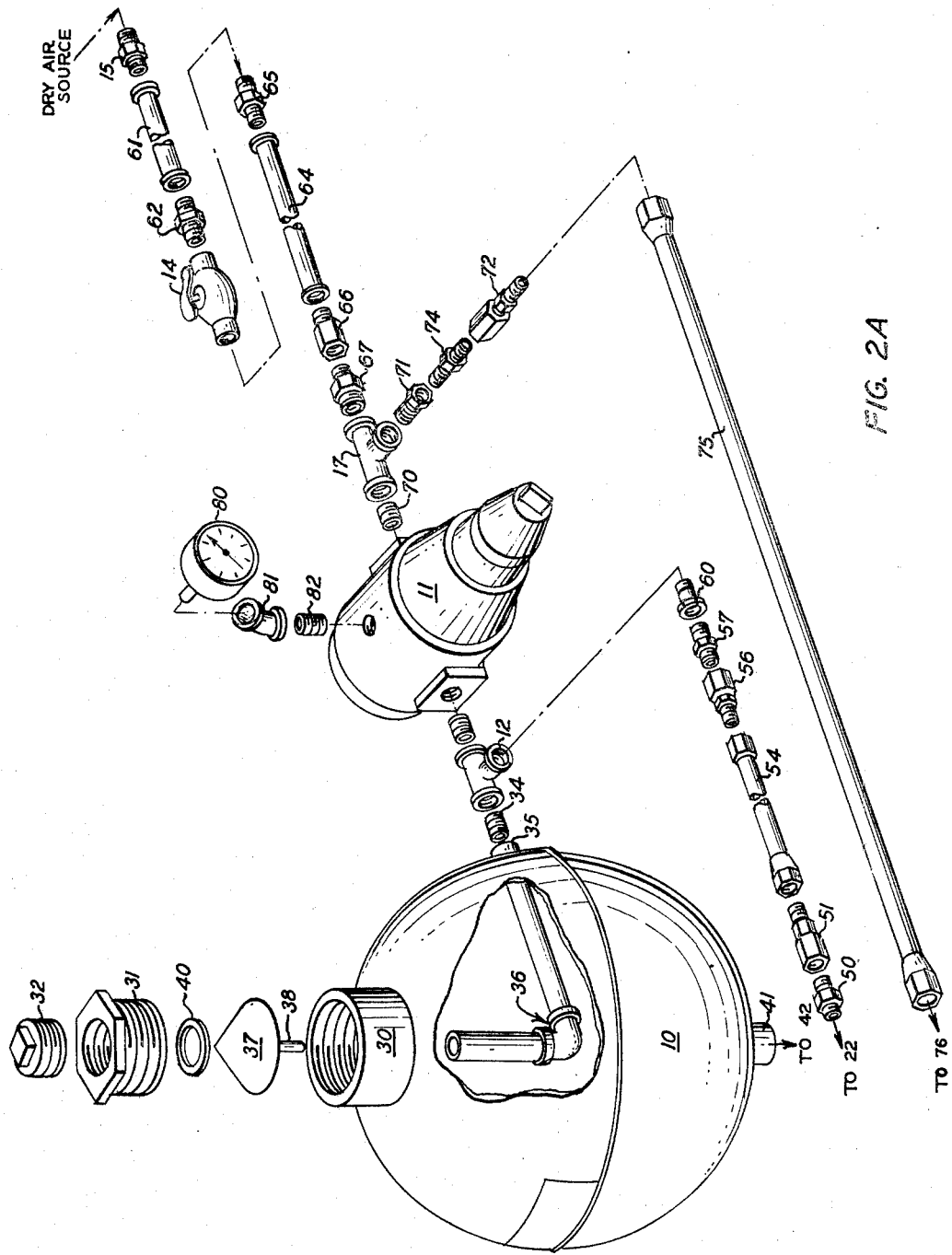

Dec. 23, 1969  R. R. COMPTON  3,485,074
APPARATUS FOR DEBURRING AND CLEANING WITH MICROSCOPIC GLASS BEADS
Filed April 29, 1968  4 Sheets-Sheet 3

INVENTOR
RICHARD R. COMPTON
BY

Mason, Mason & Albright
ATTORNEYS

Dec. 23, 1969    R. R. COMPTON    3,485,074
APPARATUS FOR DEBURRING AND CLEANING WITH MICROSCOPIC GLASS BEADS
Filed April 29, 1968    4 Sheets-Sheet 4

INVENTOR
RICHARD R. COMPTON
BY
Mason, Mason & Albright
ATTORNEYS

United States Patent Office 3,485,074
Patented Dec. 23, 1969

3,485,074
APPARATUS FOR DEBURRING AND CLEANING
WITH MICROSCOPIC GLASS BEADS
Richard R. Compton, Washington, Mo., assignor to Zero
Manufacturing Company, Washington, Mo., a corporation of Missouri
Filed Apr. 29, 1968, Ser. No. 725,057
Int. Cl. B21j 13/00
U.S. Cl. 72—53                                7 Claims

ABSTRACT OF THE DISCLOSURE

Apparatus for peening small inaccessible areas such as one-half inch in diameter or smaller holes with microscopic glass bead media by placing the media in a pressurized container having substantially the same uniform pressure as is applied to the needle nozzle utilized with a peening operation, the beads being supplied by gravity to the nozzle through a pressure regulated valve which is included in a vertical channel leading directly from the container to the conduit which terminates in the nozzle.

BACKGROUND OF THE INVENTION

There has been a gap in the art between micropressure blasting equipment such as used to clean jewelry and the like, and conventional blasting equipment, both utilizing a media such as microscopic glass beads. The conventional venturi system requires, in order to be operable, a considerable volume of air. Thus the venturi system has left much to be desired for cleaning and deburring of small surfaces and small inaccessible areas such as holes one-half of an inch in diameter and smaller. A need exists for an apparatus having a capacity to deal with small items of manufacture and utilizing a limited air consumption which at the same time gives an accurate media flow so that the surfaces are uniformly worked and thoroughly cleaned without overworking the surrounding outer surfaces.

SUMMARY OF THE INVENTION

The invention relates to an apparatus which solves the problems set forth above in its capacity to clean and debur holes one-half inch in diameter and smaller and to clean blind holes and other inaccessible areas of comparable area with an extremely limited air consumption. The apparatus of the invention permits an operator to do external work using very little material and to spot clean areas with maximum efficiency. The apparatus is adaptable to a wide range of operational pressures which in models reduced to practice can be selectively varied between two and eighty lbs. per square inch. At the same time an accurate media flow is obtained which can also be selectively regulated. The apparatus is made up largely of commercially available parts and, if operated as directed, trouble-free. The construction disclosed herein is relatively compact, having an overall height and width of about one and one-half feet. An important aspect of the invention which leads to the above advantages lies in the pressurized chamber which contains the blasting media and a more or less direct gravity feed of such media through the metering valve to the line leading to the needle nozzle.

Other objects, adaptabilities and capabilities will appear as the description progresses, reference be had to the accompanying drawings, in which:

BRIEF DESCRIPTION OF THE DRAWINGS

FIGURES 2A and 2B together give an expanded view showing the various components of the invention with the pressurized container removed in part to show the interior.

DESCRIPTION OF THE PREFERRED EMBODIMENT

Figure 1:
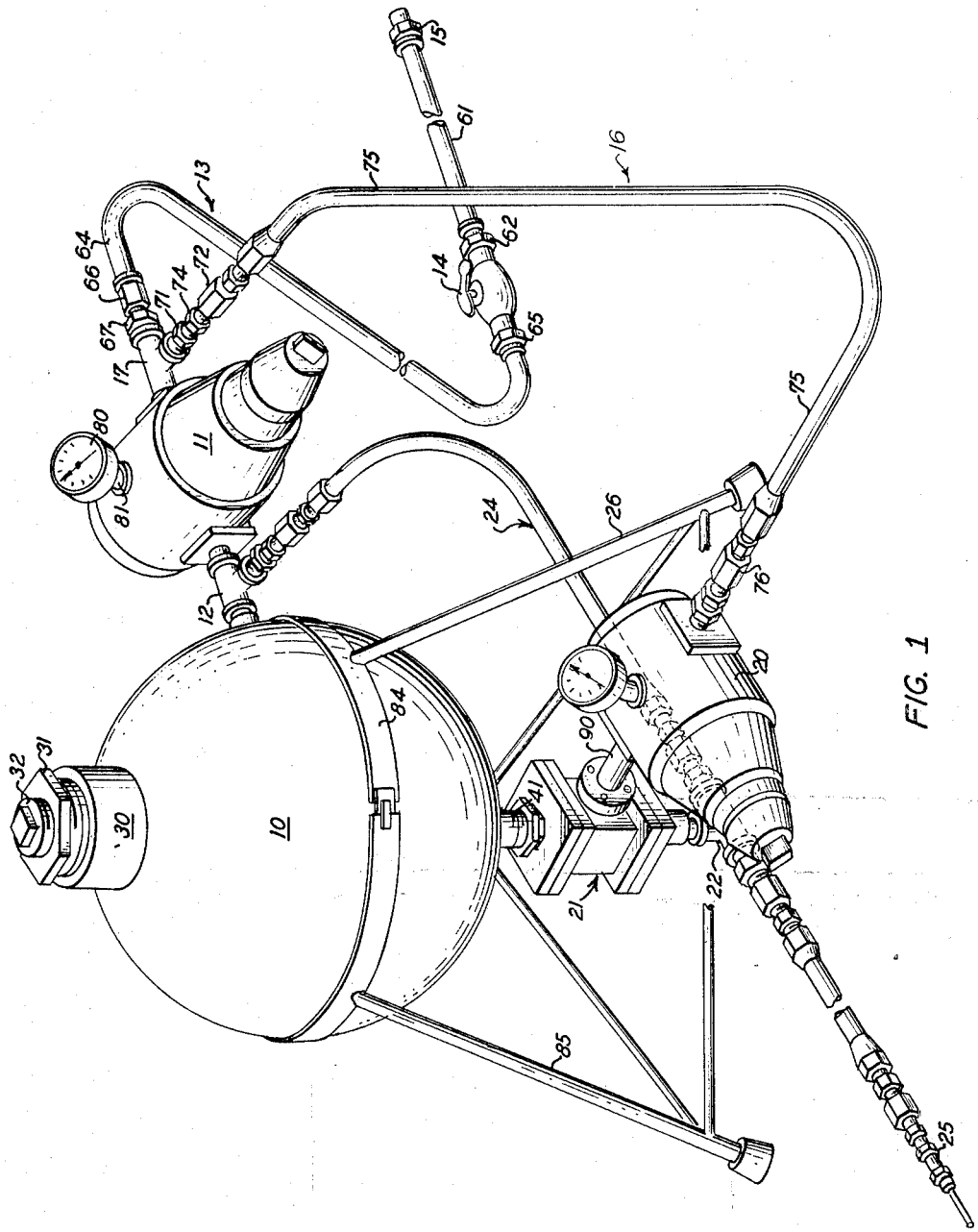
FIGURE 1 is perspective view of the invention.
Figure 2B:
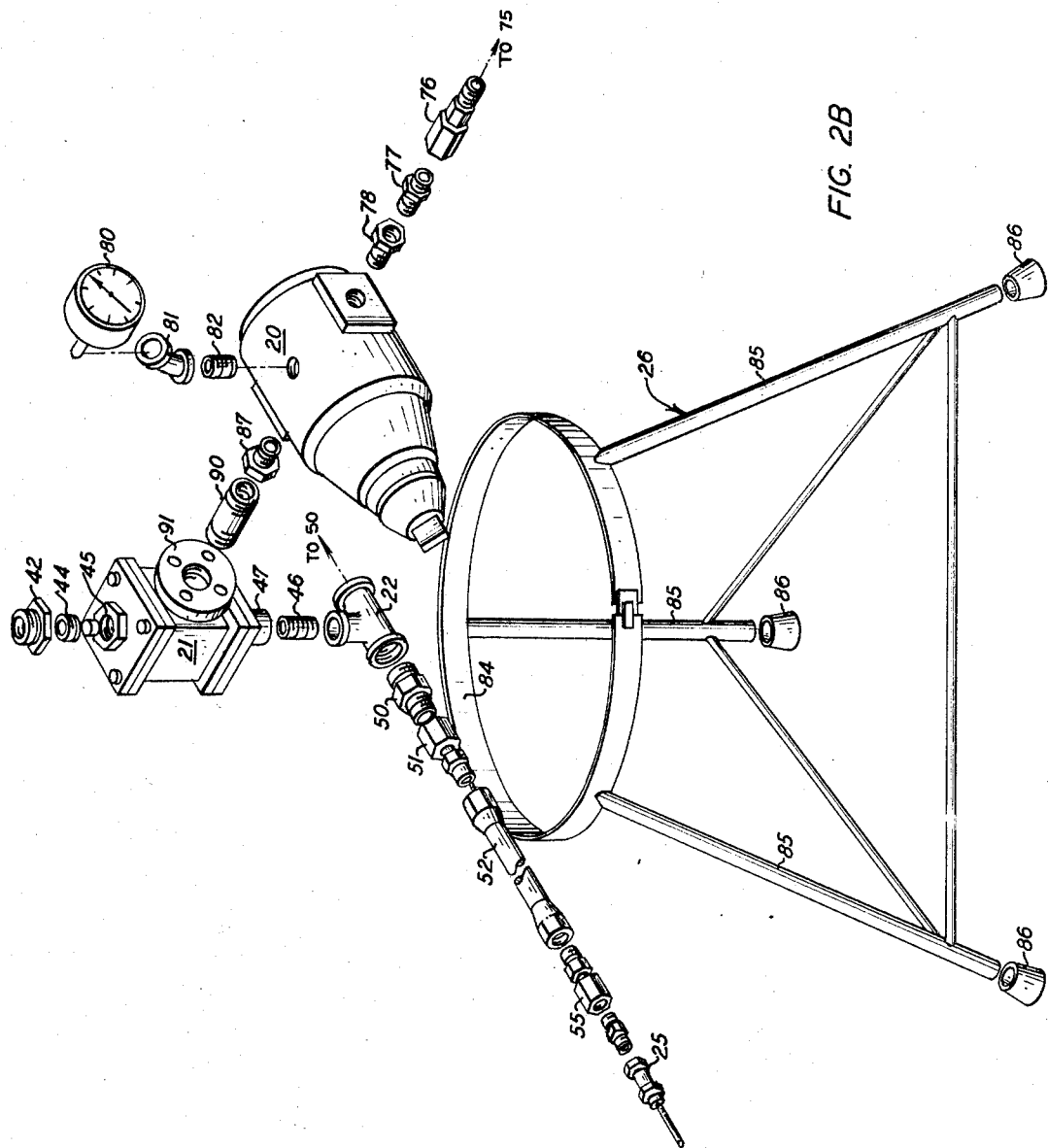

Referring to FIGURES 1, 2A, and 2B it will be seen that the spherical media container 10 is a pressurized chamber which is connected to a first air pressure regulator 11 through a T-connection 12. The first air pressure regulator 11 connects through conduit 13 having a cut-off valve 14 to a main air supply fitting 15 which connects a source of dry air under pressure (not shown). A branch conduit 16, which connects through a T-connection 17 just prior to the first air pressure regulator 11, leads to a second air pressure regulator 20. It will thus be understood that dry air under pressure from the fitting 15 communicates to the first air pressure regulator 11 and the second air pressure regulator 12 in a parallel arrangement.

The second air pressure regulator 20 serves to control the flow of treating media through the metering valve 21 into a T-fitting 22 which is disposed in a conduit 24 which leads from the T-connection 12 to a needle nozzle 25.

The apparatus is supported by a stand 26 which receives container 10.

The container 10 has a flange 30 on its upper side which receives a plunger body 31 having a pipe plug 32. The T-connection 12 connects through a nipple 34 to a coupling 35 which in turn is connected to a L-shaped pipe part 36, the vertical portion of which lies on the vertical central axis of the container 10. An aluminum cone part 37 with a stem 38 loosely received in the outlet of the pipe part 36 deflects air emitted therefrom and also deflects media which is introduced into the container 10 through the flange 30. A rubber O-ring 40 is carried in a seat at the bottom of the plunger body 31 whereby if plug 32 is removed or leaks, the part 37 is forced upward by pressure thereunder into a sealing relationship with the O-ring 40.

Figure 3:
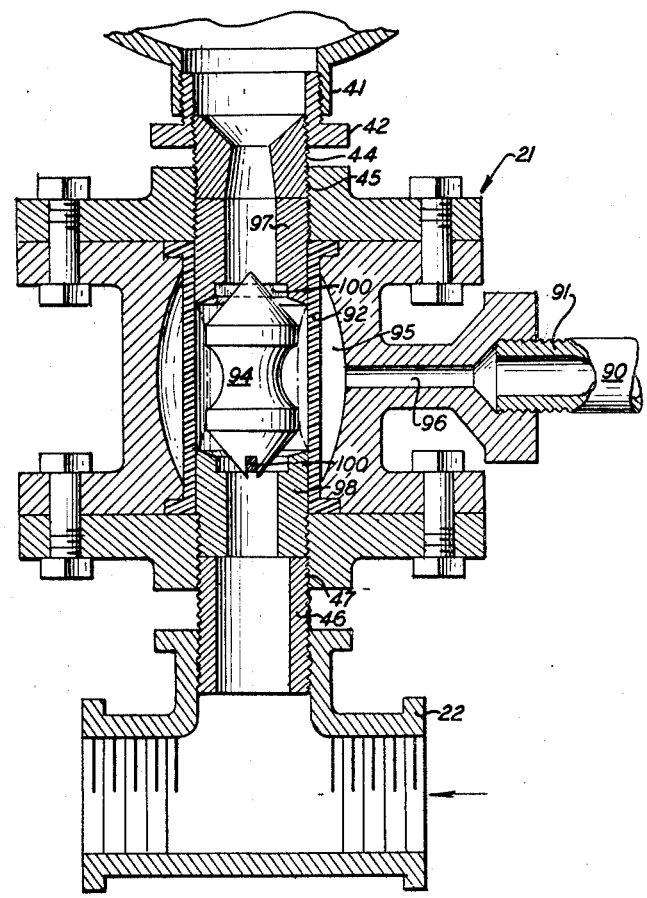
FIGURE 3 is a sectional view of the metering valve which is utilized in the invention.

Leading from the bottom portion of the container 10 is a coupling part 41 which threadably receives a bushing 42 which in turn threadably receives a close nipple 44 (FIG. 3). The media dispensing valve 21 is connected to the nipple 44 at its inlet 45 and to a further close nipple 46 at its discharge 47. The nipple 46 in turn is received by the T-fitting 22. Each of the horizontal openings of the T-fitting 22 receive bushing 50 which connect to brass swivel fittings 51 adapted for connection to air hoses 52 and 54. The other end of the air hose 52 attaches through a further brass swivel fitting 55 to the needle nozzle 25.

On the other side of T-fitting 22, the far end of the air hose 54 connects through a brass swivel fitting 56 to an adapter fitting 57 which in turn connects to a bushing 60 received by the T-connection 12.

Fitting 15 which leads to a dry air source is adapted to receive a hose 61 which connects through the coupling 62 to a cut-off valve 14 which in turn receives a further hose 64 by means of adapter fitting 65. The hose 64 is connected on its other end to a bushing 66 which provides a connection to the T-connection 17 through a coupling 67. The T-connection 17 connects to the first air pressure regulator 11 by means of a nipple 70.

The branch conduit 16 comprises a bushing 71 extending from the T-connection 17 and connected to a swivel fitting 72 by means of a coupling 74. The air hose 75, which is part of the branch conduit 16, connects at one end to the fitting 72 and the other end to a further swivel fitting 76 which leads into the second air pressure regulator 20 via a coupling 77 and a bushing 78. Each of the air pressure regulators include gauges 80 which connect to the regulators by means of forty-five degree L-fittings 81 and close nipples 82.

The stand includes an expansible ring member 84 and three legs 85 which receive rubber tips 86.

The second air pressures regulator 20 connects through a bushing 87 to a nipple 90 which is received in the control outlet 91 of the metering valve 21.

Referring to FIGURE 3 it will be seen that a flexible sleeve 92 is secured within the valve to surround the core member 94 and to seal hermetically a vertically disposed channel leading from the bottom of the container 10 to the T-fitting 22 from an annular chamber 95 which surrounds the sleeve 92 and is connected by means of an orifice 96 to the second air pressure regulator 20 via the nipple 90 and bushing 87. The core 94 is held in place within the metering valve 21 by a pair of bushings 97 and 98 and bars 100 which extend transversely from the tips of the core 94 into corresponding slots or shoulders in bushings 97 and 98. Thus treating media from the inside of the container 10 drops by gravity between the sleeve 92 and the core 94 to the T-fitting 22 where it is carried along by air to the needle nozzle 25.

The flexible sleeve 92 is so conformed that with equal pressure on each side, that is the pressure about the core 94 being the same as that within the annular chamber 95, it resiliently presses against the core 94 as shown in dotted lines in FIGURE 3 and the metering valve 21 is therefore closed. Thus by regulating the pressure in the annular chamber 95 by means of the second air pressure regulator, it is possible to expand sleeve 92 and regulate the size of the opening between sleeve 92 and core 94 whereby the amount of treating material passing therethrough is also regulated. This may be accomplished by, for example, setting the second air pressure regulator 20 to produce a pressure within the annular chamber 95 which is about two pounds less than that produced in the container 10 by the first air pressure regulator 11.

When the apparatus is closed by closing the shut-off valve 14, air continues to be discharged for a short time through the needle nozzle 25 because of the air pressure within the system including container 10. The falling air pressure is communicated to the interior of the metering valve 21 between the flexible sleeve 92 and the core 94 and it reduces rapidly due to the dissipation of the air through the needle nozzle. Pressure within the annular chamber 95 falls somewhat more rapidly than that in the container 10 with the result that a small amount of media may be lost before sleeve 92 closes and remains closed until cut-off valve 14 is again opened. On the other hand, when the device is started by opening the cut-off valve 14, it takes a longer period for pressure to build up within the container 10 than within the annular chamber 95 and thus treating media is not supplied through the flexible sleeve 92 and the T-fitting 22 to the needle nozzle 25 until the desired pressure is established in container 10.

In operation, the plug 32 is removed and media is loaded therein. This is usually a fairly small charge, not more than, say, five pounds. The main air supply is then connected to the fitting 15. For proper operation of the unit, it is important that the air and the media be dry. The plug 32 having been secured after loading, cut-off valve 14 is opened and the container 10 is pressurized. An accurate media flow is obtained by adjusting the second air pressure regulator 20 which controls the opening between core 94 and sleeve 92 in the media metering valve 21. The gauges 80 are observed to obtain the correct pressure in the container 10 and in the annular chamber 95—the latter pressure normally being less than that in the container by about two pounds per square inch.

The needle nozzle 25 is preferably replaceable hard chromium cap tubing having different internal diameters for various applications. In the event that the needle should clog, the needle nozzle 25 is removed and checked for obstruction and the system is activated without the needle nozzle attached in order to clean the blast hose. When it is desired to change the media and clean the system, the plunger body 31 is removed and the container 10 is turned upside down to drain the media, the plunger body 31 being thereafter replaced.

The apparatus in operation can be used to clean small inaccessible areas such as holes one-half inch in diameter or smaller without overworking the surrounding outer surfaces and with an extremely limited air consumption. It has been found that the metering valve 21, arranged as shown, accurately meters a selected uniform amount of media to the needle nozzle 25 whereby a dependable blasting effect is obtained.

Although I have described the preferred embodiment of my invention, it is to be understood that it is capable of other adaptations and modifications within the scope of the appended claims.

Having thus described my invention, what I claim as new and desire to secure by Letters Patent of the United States is:

1. Apparatus for peening small inaccessible areas with microscopic media which comprises
   an air pressure source (15),
   conduit means (13, 16) connected to such source,
   first (11) and second air pressure regulators (20) connected in parallel to said source through said conduit means,
   a media pressure chamber container (10) having means (32) for introducing media therein,
   an air pressure control media metering valve (21) connected to the lower portion of said pressure chamber container,
   said first air pressure regulator connected to and governing the air pressure in said pressure chamber container,
   the second air pressure regulator connected to and adapted to control said metering valve,
   a further conduit (24) leading from the said air connection between said first air pressure regulator and said pressure chamber container to a treating nozzle (25),
   an outlet (46, 47) from said metering valve connected into said further conduit (22, 24) leading to said treating nozzle,
   and a cut-off valve (14) in said first mentioned conduit means adapted to open and close air supplied therefrom simultaneously to said pressure regulators.

2. Apparatus in accordance with claim 1 wherein said pressure chamber container is spherical in shape and said media flows therefrom to said further conduit through said metering valve by gravity.

3. Apparatus for peening small inaccessible areas with media composed of microscopic particles which comprises
   an air pressure source (15),
   a media air pressure chamber container (10),
   a media metering valve (21) connected to the lower portion of said container where it receives media therefrom by gravity,
   first air regulation means (11) interconnecting said air pressure source and said container for maintaining within said container a selected uniform pressure,
   a second air regulation means (20) interconnecting said air pressure source and said metering valve for selectively controlling media passing from said container through said metering valve,
   a conduit leading from the connection (12) between said first air regulation means and said container to the discharge (46, 47) of said metering valve wherein it receives media passing through said metering valve and thence to a needle nozzle disposed on the end of said conduit.

4. An apparatus in accordance with claim 3 wherein said conduit is connected to said connection proximate said container.

5. An apparatus in accordance with claim 4 wherein such container is substantially spherical in shape.

6. An apparatus in accordance with claim 3 wherein said metering valve comprises a collapsible cylindrical sleeve (92) subjected on its outer side (95) to pressure from said second air regulation means and which is surrounded by vertical passageway containing a core (94) whereby said metering valve is opened by reducing the relative pressure on the outside of said sleeve and is closed against said core by raising said pressure outside of sleeve relative to the pressure within said sleeve.

7. An apparatus in accordance with claim 6 wherein said vertical passageway is part of a vertical channel leading from the bottom of the container directly to said conduit.

References Cited

UNITED STATES PATENTS

| | | | |
|---|---|---|---|
| 2,371,434 | 3/1945 | Eppler | 51—12 |
| 2,938,305 | 5/1960 | Bipes | 51—12 |
| 3,089,285 | 5/1963 | Moore | 51—12 |
| 3,138,845 | 6/1964 | Hellmann | 72—53 |

CHARLES W. LANHAM, Primary Examiner

G. P. CROSBY, Assistant Examiner

U.S. Cl. X.R.

51—12, 319